Patented Apr. 12, 1927.

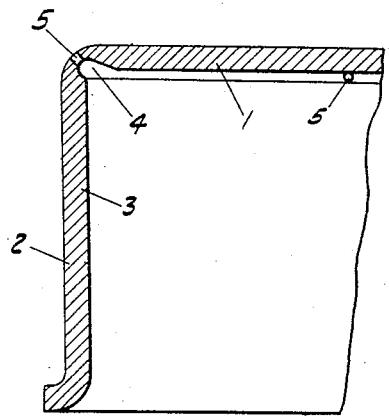
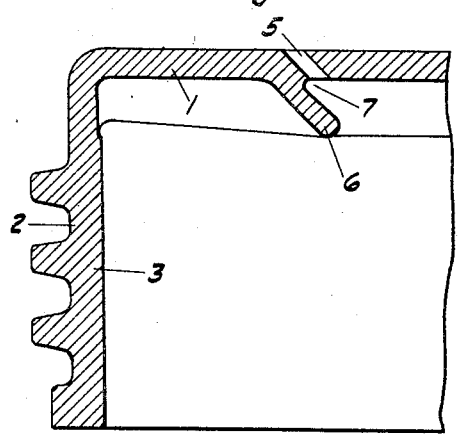
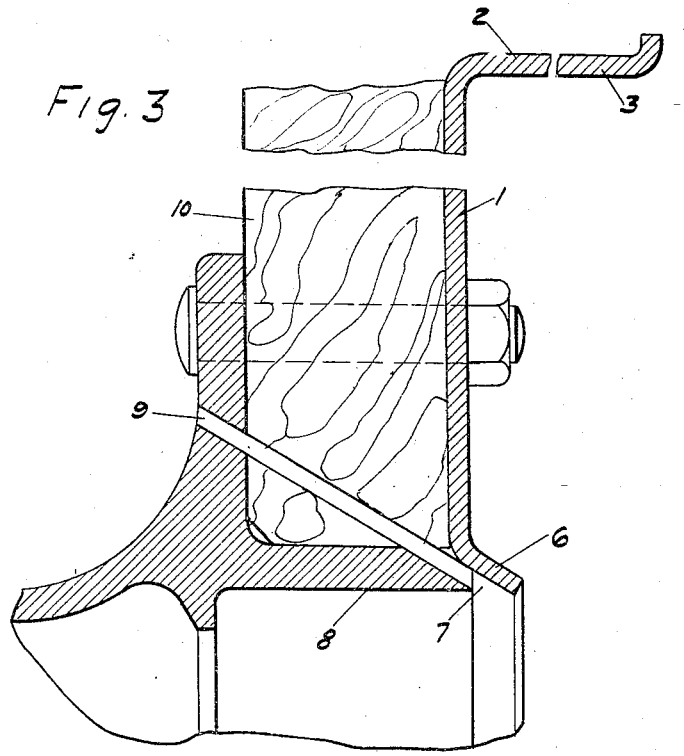

1,624,220

UNITED STATES PATENT OFFICE.

ADIEL Y. DODGE, OF SOUTH BEND, INDIANA, ASSIGNOR TO BENDIX BRAKE COMPANY, OF CHICAGO, ILLINOIS, A CORPORATION OF ILLINOIS.

BRAKE-DRUM OIL GUARD.

Application filed November 28, 1924. Serial No. 752,566.

The object of this invention is to provide means for preventing lubricant used for lubricating the wheel bearings of a vehicle, such as an automobile, from reaching the braking surfaces, comprising the inner surface of the flange of the drum and the brake shoes. Numerous devices, such as felt washers, have been, and are in use at the present time to prevent the lubricant from creeping out of the wheel hubs along the head wall of the brake drum, and reaching the said braking surfaces through the effect of centrifugal and gravity forces. It is clearly understood that when this lubricant reaches the braking surfaces, particularly, in any quantity, the braking effect will be greatly reduced with obvious results.

In my application Serial No. 752,567 filed Nov. 28, 1924, I have shown and described a separately constructed oil guard to be installed within the brake drum.

It is the object of my present invention to provide means integral with the drum itself for diverting lubricant from the braking surfaces.

In the drawing, Figure 1 shows a fragmentary view of a brake drum of conventional form, with means at the junction of the flange and head of the drum whereby centrifugal force is utilized to prevent lubricant from getting on to said braking surface.

Figure 2 shows a cast iron brake drum having a diverting lip cast integral with the head of the drum.

Figure 3 shows a portion of a wheel hub of conventional form with a part of the wheel and brake drum, which is of the pressed type, having the diverting lip formed integral with the drum.

In the drawing wherein like numbers refer to corresponding parts in their various views, 1 is the head of the drum having a flange 2 on the inner surface 3 of which brake shoes are adapted to engage. In order to prevent the lubricant from getting on to the braking surface 3, as illustrated in Fig. 1, a groove 4 is cut in the brake drum at the junction of the head 1 of the flange 2. The groove may be of any desired form and constructed so as to reduce, as little as possible, the strength at the junction of the head 1 and flange 2. The outside diameter of the groove 4 should be greater than the inside diameter of the drum across the braking surface 3. The depth of the groove 4, of course, would depend on the kind of material from which the drum is made and on the thickness of the wall thereof, together with the strains that are to be applied to the drum. At the bottom of the groove 4 is a series of holes 5 which are used to carry the lubricant out of the groove as fast as it collects therein, through the reaction of centrifugal and gravity forces.

In Fig. 2 a lip 6 is cast integral with the head of the drum 1. This lip extends toward the axis of the drum at an acute angle with the head of the drum thereby forming an annular pocket 7 which collects the lubricant as it is forced along the head of the drum from the bearings or wheel spindle. A series of holes 5 are provided to carry the lubricant out of the pocket 7.

In Fig. 3 the lip 6 is formed from the inner orifice of the head of the drum so as to form a pocket 7 at the junction with the hub of the wheel 8. A series of holes or passages 9 pass through the wheel, which passages may be lined with small tubes if desired, particularly, where the spokes 10 of the wheel are made of wood as illustrated in Fig. 3. From the construction shown in Fig. 3, as the lubricant works out of the bearings, it is trapped in the pocket 7 by means of the lip 6 and forced through the passages 9 to the exterior of the wheel. It will be readily understood that the details of my invention may be modified without departing from the spirit of the same or the scope of the appended claims.

Having thus described my invention, what I claim is:

1. A wheel assembly comprising, in combination, a hub, a wheel portion, and a brake drum having a part arranged to catch oil from the end of the hub, the wheel portion being formed to conduct the oil from the base of said part to the outside of the assembly.

2. A wheel assembly comprising, in combination, a wheel, a hub, and a brake drum having its inner edge conically flanged to catch oil from the end of the hub and conduct it to the outside of the drum.

3. A wheel assembly comprising, in combination, a wheel, a hub, and a brake drum having its inner edge conically flanged to catch oil from the end of the hub, the wheel being formed with conduits leading from the base of said flange to the outside of the wheel.

4. A wheel assembly comprising, in combination, a hub, and a brake drum so arranged that the hub just projects past its back and with a short conical surface aligned with the end of the hub to catch oil therefrom and conduct it outside the drum, while leaving substantially all the interior of the drum unobstructed.

5. A brake drum having a head and a substantially cylindrical braking flange, and formed with a short conical surface at the inner edge of the head to conduct oil away from the drum while leaving the interior of the drum substantially unobstructed.

In testimony whereof, I affix my signature.

ADIEL Y. DODGE.